United States Patent [19]

Freeman et al.

[11] Patent Number: 5,294,879
[45] Date of Patent: Mar. 15, 1994

[54] MICROPROCESSOR-CONTROLLED REGULATOR

[75] Inventors: Richard A. Freeman, St. Louis; David C. Massey, Kirkwood, both of Mo.

[73] Assignee: Basler Electric Company, Highland, Ill.

[21] Appl. No.: 786,528

[22] Filed: Nov. 1, 1991

[51] Int. Cl.$^5$ .............................................. H02P 9/00
[52] U.S. Cl. ........................................ 322/23; 322/28; 322/73
[58] Field of Search ............... 322/22, 20, 23, 24, 322/25, 27, 28, 72, 73

[56] References Cited

U.S. PATENT DOCUMENTS

| | | | |
|---|---|---|---|
| 4,275,344 | 6/1981 | Mori et al. | 322/73 X |
| 4,322,630 | 3/1982 | Mezera et al. | 290/40 |
| 4,438,385 | 3/1984 | Sato et al. | 322/28 |
| 4,477,765 | 10/1984 | Glennon et al. | 322/20 |
| 4,608,639 | 8/1986 | Morishita et al. | 322/23 X |
| 4,618,811 | 10/1986 | Mashino et al. | 322/28 |
| 4,670,704 | 6/1987 | Maehara et al. | 322/8 |
| 4,716,355 | 12/1987 | Morishita et al. | 322/73 X |
| 4,754,212 | 6/1988 | Mashino | 322/28 |
| 4,777,425 | 10/1988 | MacFarlane | 322/28 |
| 4,839,575 | 6/1989 | MacFarlane | 322/25 |
| 4,896,092 | 1/1990 | Flynn | 323/258 |
| 5,006,781 | 4/1991 | Schultz et al. | 322/25 |
| 5,038,094 | 8/1991 | Rashid | 322/28 |
| 5,077,485 | 12/1991 | Rashia | 322/25 X |

Primary Examiner—Kristine L. Peckman
Attorney, Agent, or Firm—Senniger, Powers, Leavitt & Roedel

[57] ABSTRACT

A regulator provides a control signal for controlling a generator which is providing an electrical output. The electrical output includes an output voltage and an output current applied to a load. The regulator comprises a microprocessor, voltage sensing inputs and current sensing inputs which cooperate with the microprocessor to sense a parameter of the electrical output applied to the load and a first memory for storing predetermined parameters. The microprocessor compares the sensed parameter to its corresponding predetermined parameter stored in the first memory and generates an output signal representative of the comparison. The regulator further comprises a second memory for storing instructions for controlling operation of the microprocessor and generates the control signal as a function of the output signal from the microprocessor.

22 Claims, 7 Drawing Sheets

MICROPROCESSOR-CONTROLLED REGULATOR

BACKGROUND OF THE INVENTION

This invention relates to a generator regulator having a microprocessor. This invention further relates to a generator regulator which generates a control signal as a function of the microprocessor comparison of various sensed parameters for controlling the electrical output from the generator.

It is widely known that the electrical outputs of generators, including alternators, are regulated to establish and maintain certain output parameters, such as voltage, frequency and/or current, generally constant notwithstanding fluctuations in the load, temperature, input voltage and the like.

The majority of present voltage regulating systems utilize analog circuitry. Such systems include transformer systems having a voltage sensing device to monitor the output and send a signal to a control circuit, an amplifying section which conditions the signal, and a circuit which responds to the signal by increasing or decreasing the control signal. These changes in the control signal are accomplished by electromechanical means or by an electronic power control circuit. Present regulators, even those with digital circuitry, are incapable of performing diverse functions such as controlling VAR levels, maintaining a constant power factor and maintaining a constant voltage through a single regulator.

Presently available single phase regulators may be connected in a three phase configuration yet are not capable of automatically compensating when switching between single phase and three phase electrical outputs.

Voltage regulators currently employ motorized variable resistors for adjustment. In a system having, e.g., a synchronizer, adjustments will be necessary to raise or lower the output voltage of the regulator and hence, raise or lower the output voltage of the generator. Such systems employ moving mechanical parts subject to wear, dirt, vibration and related malfunctions.

Some voltage regulating systems prevent the output current from surpassing a preselected maximum level by current limiting. The output current supplied to the load is sensed to detect excessive current conditions. If the regulator senses a low voltage condition, present regulators signal the alternator to demand increased excitation of the alternator in an attempt to increase the voltage output to the load. Additionally, some regulators will respond to effective short circuits, or zero voltage conditions, by shutting down the alternator to guard against abnormal current.

Current regulating systems, while able to increase or decrease excitation levels in the alternator, cannot limit excitation levels to a minimum and a maximum for a safe operating range to prevent damaging the alternator by overheating or creating a loss of synchronism.

Some presently available regulators detect faults in the sensor circuits. A break in a sensing lead or a loose terminal in the sensing circuit effectively opens the circuit causing the regulator to shut down the alternator. In such systems, there is no indication of the cause of a shutdown, e.g., a loss of sensing capability (open circuit) or an overtemperature condition.

In some situations, knowledge of the actual time of service of a regulator is beneficial. Present systems are incapable of making such a measurement.

SUMMARY OF THE INVENTION

Among the several objects of the invention may be noted the provision of a regulator providing a control signal to a generator; the provision of such regulator which operates from a microprocessor; the provision of such regulator which generates a control signal as a function of sensed parameters; the provision of such regulator which operates to control generators in systems with high speed transients; the provision of such regulator which operates to control generators in steady state systems; the provision of such regulator which limits excitation of the generator to within a minimum and a maximum level to prevent a loss of synchronism and overheating; the provision of such regulator responsive to phase and magnitude components of the generator current output; the provision of such regulator responsive to phase components of the generator voltage output; the provision of such regulator responsive to a phase relationship between the output voltage and current; the provision of such regulator which maintains the voltage magnitude of the output at a desired level; the provision of such regulator which maintains the reactive component of the output current at a desired level; the provision of such regulator which maintains the power factor of the electrical output at a desired level; the provision of such regulator which determines the phase rotational configuration of the electrical output; the provision of such regulator which determines whether it is connected in single phase or three phase mode and controls the generator in response to the determination; the provision of such regulator which measures the time of actual service of the regulator; the provision of such regulator which allows for remote static adjustments; the provision of such regulator which provides for data input to calibrate, initialize and enable the system; the provision of such regulator which provides for monitoring the generator output; the provision of such regulator which provides for initial stability adjustments; the provision of such regulator which records and displays the causes of protective shutdowns; and the provision of such regulator which is economically feasible and commercially practical.

Briefly described, a regulator of the present invention is for providing a control signal to a generator which is providing an electrical output applied to a load. An output voltage and an output current are included in the electrical output which is controlled by the control signal. The invention includes means for sensing a parameter of the electrical output applied to the load, a first memory for storing predetermined parameters, a microprocessor for comparing the sensed parameter to the corresponding predetermined parameter stored in the first memory, and a second memory for storing instructions for controlling the operation of the microprocessor. The microprocessor generates an output signal representative of the comparison between the sensed and stored parameters. Means in the regulator then generates the control signal as a function of the microprocessor's output signal.

Other objects and features will be in part apparent and in part pointed out hereinafter.

BRIEF DESCRIPTION OF THE DRAWINGS

FIGS. 4A and 4B are parts of a schematic diagram of one preferred embodiment of the regulator according to the invention showing the circuitry between the voltage sensing inputs and the signals provided to the field winding. Additionally, FIG. 4A illustrates the generator voltage sensing and FIG. 4B illustrates the power switch, thermal shutdown device, and hardware current limit.

Corresponding reference characters indicate corresponding parts throughout the several views of the drawings.

DESCRIPTION OF A PREFERRED EMBODIMENTS

Figure 1:
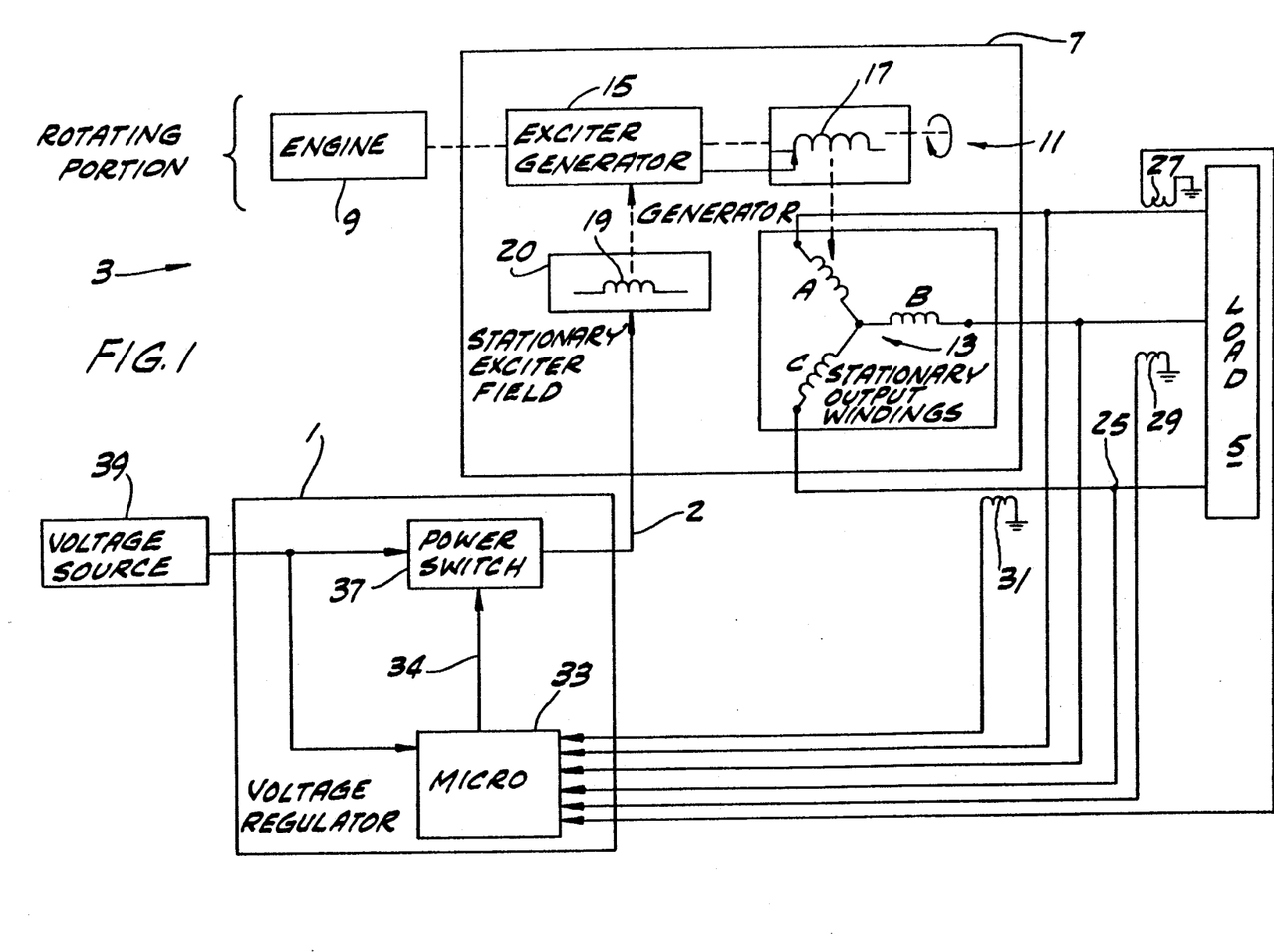
FIG. 1 is a block diagram of a voltage regulator system in accordance with the present invention.

A block diagram of a regulator 1 of the present invention is shown in FIG. 1 connected in an electrical system 3. The regulator 1 provides a control signal via line 2 for controlling an electrical output which is applied to a load 5 by the generator 7. In an embodiment of the present invention, an engine 9 drives the generator 7 to produce a rotating magnetic field 11. The rotating field 11 is magnetically coupled to a three-phase output winding 13 connected to the load 5 and induces current in output windings A, B and C, each representative of a phase of three-phase output. The output current and the output voltage induced in the windings constitute the electrical output supplied to the load 5.

Engine 9 drives an exciter generator 15 in synchronism with the generator 7 to energize an exciter winding 17 of the generator 7 to generate a magnetic field which is a primary component of the rotating field 11. A field winding 19 is coupled to the exciter generator 15 to affect changes in the rotating field 11, and thus affect changes in the electrical output induced in the output winding 13.

The energization of the field winding 19 generates a magnetic field which is a primary component of a stationary exciter field 20 which is a function of a control signal provided by the regulator 1 via line 2 to maintain certain parameters of the electrical output induced in the output winding 13 within desired levels. To generate the control signal, the regulator 1 senses various parameters of the electrical output induced in the winding 13. The voltages between the lines A, B and C are sensed through direct connection to the output winding 13 depicted at nodes 21, 23 and 25. Current measurements are obtained by sensing the current induced in current transformers 27, 29 and 31 on each output line A, B and C. These sensed output voltage and output current are input to the voltage regulator 1. The regulator 1 includes a microprocessor 33 for generating an output signal via line 34 responsive to the sensed voltages and currents. The output signal from the microprocessor 33 controls the duty cycle of a pulse-width modulated (PWM) drive operation resulting in a square wave output via line 34 of variable duty cycle. The square wave output of the PWM drive activates and deactivates a power switch 37 which turns on (closes) and turns off (opens) as the square wave goes high and low, respectively. The power switch 37 is connected to a voltage source 39 which generates an alternating current for energizing the field winding 19 to generate the exciter field 20. Thus, the control signal via line 2 is a pulse-width modulated alternating current and the energization of the field winding 19 is a function of the duty cycle of the square wave generated by the PWM drive which is a function of the microprocessor 33 output signal via line 34. Therefore, the exciter field 20 is a function of the microprocessor 33 output signal. The duty cycle is varied by the regulator 1 as needed to induce the desired output in output winding 13. The power switch 37 and PWM drive circuit 35, in cooperation with the microprocessor 33, constitute means for generating the control signal provided via line 2 as a function of the microprocessor output signal provided via line 34, and means for energizing the field winding 19 in response to the microprocessor output signal.

When the field winding 19 is not energized, no exciter field 20 is generated and the rotating field 11 is solely the result of energization of the exciter winding 17 by the exciter generator 15.

The voltage regulator 1 is powered as part of the load 5, as indicated in FIG. 1, through a coupling transformer (not shown). An alternative source, such as a separate permanent magnet generator (PMG) (not shown) may power the regulator 1.

Figure 2:
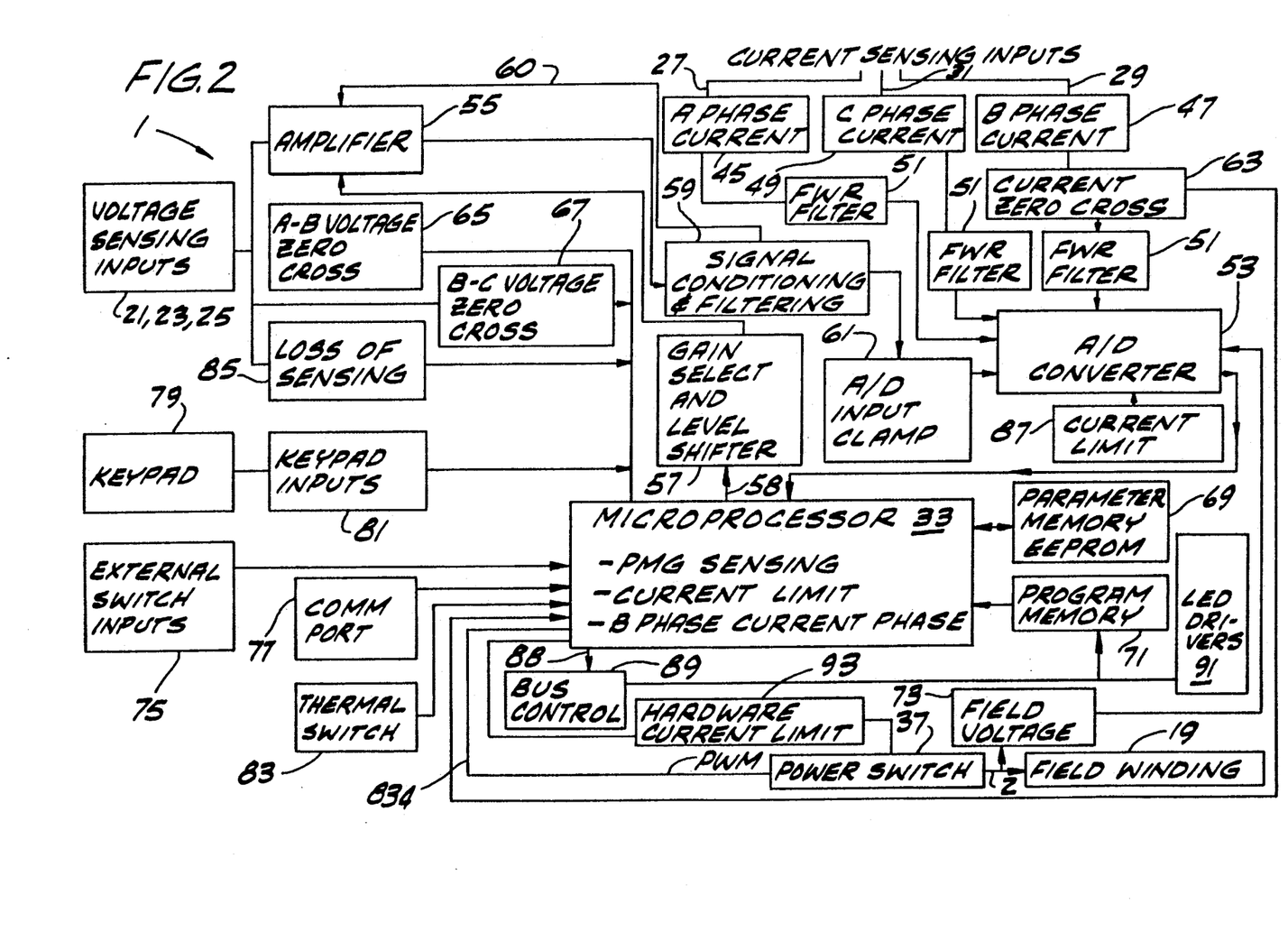
FIG. 2 is a block diagram of the voltage regulator of the invention as shown in the system of FIG. 1.

The regulator 1, as depicted in greater detail in FIG. 2, includes current sensing transformer 29 (see FIG. 1) coupled to the output of the B output winding for sensing current supplied to the load 5 by the output winding 13. Voltage sensing inputs 21, 23 and 25 are connected to the outputs of the A output winding, the B output winding and the C output winding for sensing the voltage applied to the load 5 across the coils of the output winding 13. The voltage and current sensing inputs cooperate with the microprocessor 33 and constitute means for sensing a parameter of the electrical output applied to the load 5. The current signal is illustrated in block diagram form as B phase current 47. The sensed current signal is rectified and filtered by a full wave rectifier (FWR) and filter 51 before being input to an analog to digital (A/D) converter 53.

The sensed voltage signals are input to an amplifier 55 having a gain level which is controlled by a gain select and level shifter circuit 57. The gain select and level shifter circuit 57 varies the gain level of amplifier 55 based on instructions from the microprocessor 33 provided in the form of a signal via line 58. The sensed voltage signals are conditioned and filtered through a signal conditioning and filtering circuit 59 which also provides a feed back signal via line 60 to amplifier 55. The conditioned voltage signals are then converted to a digital signal before being input to the microprocessor 33 by passing through an A/D input clamp 61 connected to the A/D converter 53.

Reference character 63 refers to a current zero crossing detector circuit. The B line current has its waveform analyzed by circuit 63 to detect the zero crossing so that the phase angle of the sensed B line current signal can be defined. The transformer 29 and the current zero crossing detector circuit 63 cooperate with the microprocessor 33 to constitute means for detecting a phase component and a magnitude component of the output current.

An A-B voltage zero crossing detector 65 is connected across the A and B coils and an B-C zero crossing detector 67 is connected across the B and C coils to detect the zero crossings of the A-B and B-C voltage waveforms. As a result of having detected the information, the microprocessor 33 can determine a phase difference between the sensed voltage waveforms and also determine a phase relationship between the current and voltage waveforms. The phase relationship between the voltage and current waveforms is defined by an angular difference between the phase component of the output current and the phase component of the output voltage. The current magnitude and the phase relationship are determined in order to find a reactive component of the current. The voltage sensing inputs 21, 23, 25 and the voltage zero crossing detectors 65 and 67, in cooperation with the microprocessor 33, constitute means for detecting a phase component of the output voltage. As a result, the microprocessor 33 determines a phase relationship defined by an angular difference.

The period of time between zero crossings for each voltage waveform is measured by microprocessor 33 to determine the phase difference between waveforms. Thus, the microprocessor and zero crossing detectors constitute means for determining a phase difference between the A-B waveform and the B-C waveform. For three phase operation, the regulator 1 has three inputs A, B, C, each of which is connected to one coil of the output winding 13. For single phase operation, the three inputs A, B, C are all connected to the single coil of the output winding. In general, the regulator 1 selects predetermined parameters stored in a parameter memory 69 based on the determined phase difference. In particular, the microprocessor 33, responsive to the zero crossing detectors 65 and 67, selects parameters corresponding to a single phase configuration when the phase difference is approximately 0°, that is, the A-B and B-C voltage waveforms are essentially identical. Parameters corresponding to an A-B-C phase configuration are selected when the phase difference is such that the A-B waveform leads the B-C waveform by approximately 60°. Parameters corresponding to an A-C-B phase configuration are selected when the phase difference is such that the A-B waveform lags the B-C waveform by approximately 60°. Therefore, the microprocessor 33 and zero crossing detector constitute means for selecting predetermined parameters in response to phases sensed by the phase sensing means. The microprocessor 33 reads from the parameter memory 69, such as an EEPROM, the angle determined between the voltage zero crossings and the current zero crossing at unity power factor. This angle is different for single phase, three phase A-B-C phase configuration and three phase A-C-B phase configuration. The microprocessor 33 also reads two tables stored in EEPROM 69 to convert signals from the A/D converter 53 into voltages for single phase or three phase systems. One table corresponds to single phase and the other corresponds to three phase.

The microprocessor 33 in combination with the leads 21, 23 and 25 connected to the output winding 13, the current transformer 29 and the zero cross detectors 63, 65 and 67 constitute means for sensing one or more phases of the output voltage, for detecting a voltage waveform between the A and B inputs and the B and C inputs, for determining the phase relationship and for determining the phase and magnitude components of the output voltage and current.

The electrical output applied to the load 5 may be controlled by the regulator 1 with respect to voltage magnitude (VR) applied to the load, the power factor of the current (PF) applied to the load 5, or the reactive component of the current (VAR) applied to the load 5. The user can selectively activate either voltage regulation (VR), or current regulation (CR), such as PF or VAR control.

Figure 3:
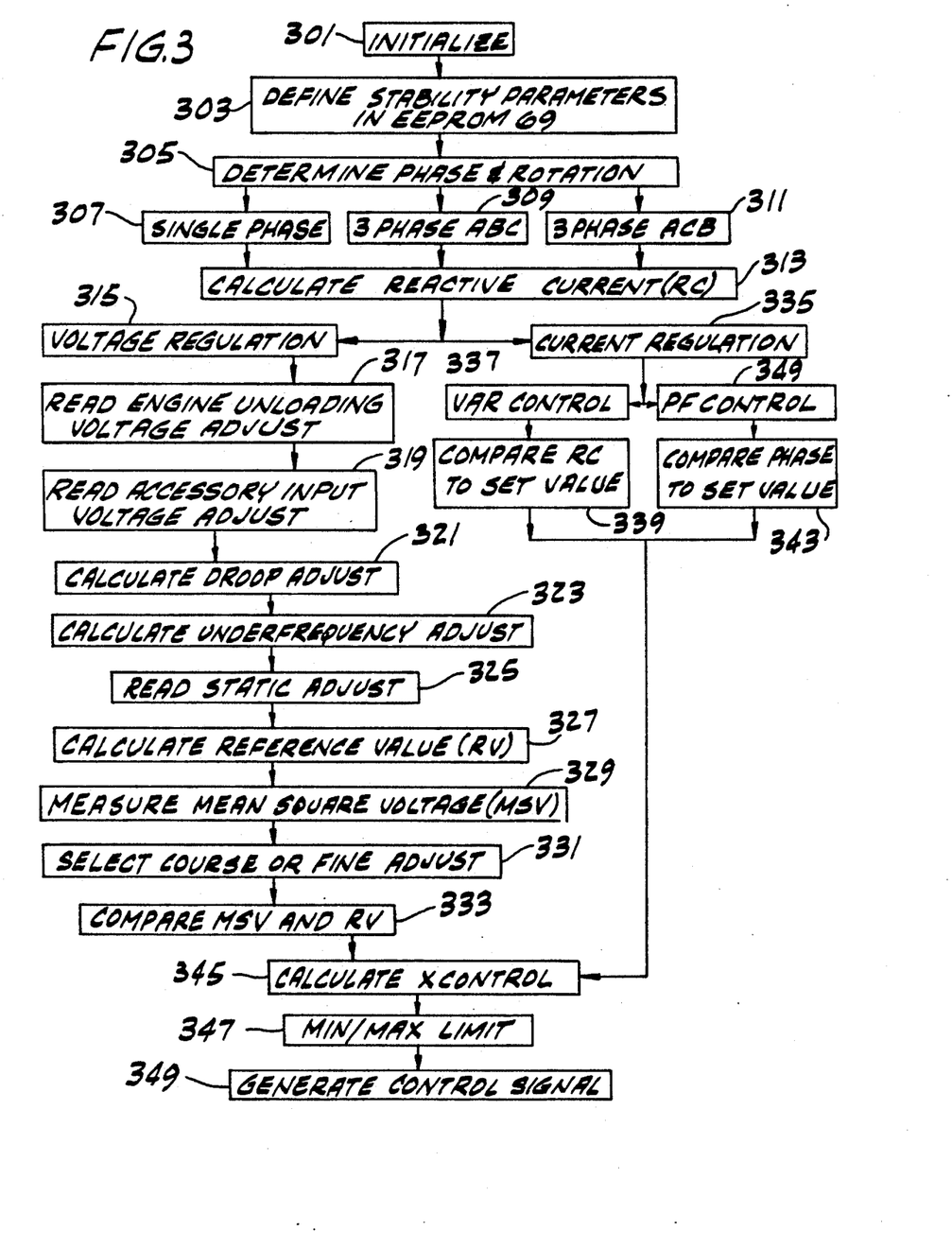
FIG. 3 is a flow chart of the operation of the microprocessor according to the invention illustrating the various decisions, steps, and calculations through which the microprocessor progresses.

The selected one of the above-mentioned parameters (VR, PF, VAR) is compared to its corresponding predetermined parameters by the microprocessor 33. The regulator 1 stores the predetermined parameters in a first memory, referenced in FIG. 2 as parameter memory EEPROM 69. The microprocessor 33 generates via line 34 an output signal representative of the comparison upon which the control signal provided via line 2 is based. The regulator 1 stores instructions in a second memory, program memory 71, for controlling the operation of the microprocessor 33. FIG. 3, described below, illustrates the programmed operation of the microprocessor 33.

Referring now to FIG. 3, operation of the regulator 1, and particularly operation of the microprocessor 33, will be described by reference to the flow chart of this figure. Step 301 initializes the microprocessor 33 to a predetermined set of parameters chosen for optimum performance of regulator 1.

After initialization at step 301, the microprocessor 33 selects the stability parameters stored in EEPROM 69 at step 303 in response to operator input through a keypad 79, including keypad inputs 81. The operator designates the type of generator 7 to which the regulator 1 is connected. Each generator has a corresponding set of stability parameter stored in EEPROM 69. The first memory EEPROM 69 stores a predetermined set of parameters, coefficients in control algorithms, representative of a stability range. A present embodiment has three sets of parameters, each corresponding to a particular type of generator 7 for use in the electrical system 3. Therefore, The regulator 1 is initialized to the designated set of parameters to minimize subsequent stability adjustments. The microprocessor 33 in combination with the software in program memory 71 to execute steps 301 and 303, constitute means responsive to operator input for designating the predetermined set of parameters.

Step 305 determines the phase and rotational configuration of the electrical output by means for determining a phase difference between the A-B waveform and the B-C waveform, as described above (see also FIG. 7). Based on the phase difference between the waveforms, step 307 alternatively chooses a set of predetermined parameters indicative of single phase operation, A-B-C phase rotation or A-C-B rotation, at steps 307, 309 and 311, respectively. The microprocessor 33 then calculates the reactive current (RC) of the ouput current applied to the load at step 313. Thus, microprocessor 33 includes means for detecting a phase component and a magnitude component of the output current, described above.

If voltage regulation is desired and indicated by the operator, the microprocessor 33 proceeds to step 315. Alternatively, if current regulation is desired and indicated by the operator, the microprocessor 33 proceeds to step 335. In the voltage regulation mode, the microprocessor 33 reads adjustments to the voltage output of the generator 7 stored in the EEPROM 69. Step 317 and step 319 illustrate an unloading voltage adjustment for engine 9 and an accessory input voltage adjustment, respectively. The microprocessor 33 further calculates an adjustment for waveform droop at step 321 and an adjustment for an underfrequency condition at step 323.

The microprocessor 33 reads coarse and fine voltage static adjustments at step 325. External switches 75, a first input for receiving a raise signal and a second input for receiving a lower signal, are included in the regulator 1. The regulator 1 increases or decreases the predefined voltage set point in response to the external switches so that microprocessor 33 constitutes means for increasing the set point in response to the raise signal received by the first input and means for decreasing the set point in response to the lower signal received by the second input. The increase or decrease in the set point approximately equals one volt/second.

After reading and calculating the necessary adjustments of the output voltage, the microprocessor 33 calculates a reference value (RV) representative of a desired voltage output of the generator 7 at step 327. The RV is calculated by the microprocessor 33 from the static adjuster input for coarse voltage adjustments, the static adjuster input for fine voltage adjustments, the voltage adjustment for controlling droop, the engine 9 unloading voltage adjustment, the accessory input voltage adjustment, and the underfrequency compensation voltage adjustment by the following algorithm:

$$RV = FRSP + AI + UF - EU + D$$

where:
RV is the reference value or regulation target voltage;
FRSP is a flat regulation set point;
AI is the accessory input voltage adjustment;
UF is the under frequency compensation voltage adjustment;
EU is the engine 9 unloading voltage adjustment;
D is the voltage adjustment for controlling droop; and where:

$$FRSP = 6 * CVA + 0.5 * CVA + RU - RD$$

where:

CVA is a course voltage adjustment (static adjuster) from the EEPROM 69 (a default value or specified by operator);
FVA is a fine voltage adjustment from the EEPROM 69;
RU is 1 volt/second of remote up static adjustment;
RD is 1 volt/second of remote down static adjustment; and where:

$$AI = (ACC - 512) * Kacc$$

where:
ACC is an accessory analog to digital input value;
Kacc is an accessory gain from the EEPROM 69; and
where:
UF=0 if the generator 7 frequency is greater than or equal to UFSP UF=(UFSP−f) * Kuf if the generator 7 frequency is less than UFSP where:
f is the observed frequency in hertz;
UFSP is the under frequency set point in hertz from the EEPROM 69;
Kuf is the under frequency gain from the EEPROM 69; and where:
EU=0 if the generator 7 frequency is greater than or equal to EUSP
EU=0 if the generator 7 frequency is less than EUSP and Df is not greater than EUCR
EU=(EUSP−f) * Keu if the generator 7 frequency is less than EUSP and Df is greater than EUCR where:
f is the observed frequency in hertz;
EUSP is an engine 9 unloading frequency set point in hertz from the EEPROM 69;
Keu is the engine unloading gain from the EEPROM 69;
Df is a change in observed frequency in hertz/second;
EUCR is a set point for change in observed frequency in hertz/second to start engine 9 unloading from the EEPROM 69; and where:
D=1 * RC * Kd if the power factor is leading
D=−1 * RC * Kd if the power factor is lagging
where:
RC is the reactive current observed in the B phase current transformer 29; and
Kd is the droop gain from the EEPROM 69.

These voltage adjustments define the behavior of the voltage regulator 1. The output voltage of each phase, as sensed by inputs 21, 23, 25, is sampled multiple times per second by the A/D converter 53 so that microprocessor 33 can measure a mean-squared voltage (MSV) value for each phase in step 329. Microprocessor 33 compares this MSV value at step 333 to its corresponding reference value, RV, as calculated above. The comparison value is used in a control algorithm (noted below) to calculate a control signal (Xcontrol) corresponding to the amount of field voltage 73, as referred to in FIG. 2, required to obtain the desired output voltage. Such constitutes voltage regulation means.

If current regulation is desired, the microprocessor 33 proceeds to step 335 where two current regulation modes are available, VAR control at step 337 and PF control at step 341. VAR and PF control are described above. The microprocessor 33 compares the reactive current to a set value stored in EEPROM 69 at step 339 if VAR control is desired, or compares the phase to a set value at step 343. After the microprocessor 33 makes the comparison at step 333, step 339 or step 343, it calculates the control signal (Xcontrol) as a function of the comparison in step 345.

The voltage regulation control beginning with step 315 adjusts the control signal to maintain a magnitude of the output voltage applied to the load 5 at or near a predefined set point. The microprocessor 33 includes means for modifying the predefined set point as a function of the reactive component of the current thereby producing a droop in the output voltage.

The volt-ampere-reactive (VAR) control adjusts the control signal based on both the output current phase component and the output current magnitude component to maintain the reactive current at a preset value stored in first memory 69 and constitutes VAR means.

The power factor (PF) control adjusts the control signal based on the phase relationship to maintain the angular difference at a preset level stored in first memory 69 and constitutes PF means.

At step 345, microprocessor control is obtained through use of control algorithms which determine the PWM duty cycle which provides the needed amount of field voltage 73 to be applied to exciter field 19 to perform the desired regulation. The second memory 71 includes the following discrete time control algorithm (high speed transient):

$$Xcontrol = K * (a2 * X3 - a1 * X2 + a0 * X1)$$

where:
 X1 = X2'
 X2 = X3'
 X3 = Xtarget − Xsensed + X3'; and
where:
 X1, X2 and X3 are variables stored in the first memory 69 calculated in this iteration of the control algorithm, and X1', X2' and X3' are the same variables of the previous iteration;
 Xtarget is a desired electrical output;
 Xsensed is the sensed parameter (such as phase, current, voltage);
 a0, a1 and a2 comprise the predetermined set of parameters stored in the first memory 69 representative of the stability range adapted for the type of generator 7 (see step 303);
 K is a forward gain setting; and
 Xcontrol is a duty cycle of the pulse-width modulated output signal.

The second memory 71 includes the following discrete time control algorithm (steady state):

$$Xcontrol = X control' + Kp * Pc - Ki * Ic - Kd * Dc$$

where:
 Xcontrol is the duty cycle of the pulse-width modulated output signal;
 Xcontrol' is the Xcontrol from the previous iteration;
 Pc is the proportional component of the comparison of Xtarget and Xsense; Pc = Xtarget − Xsense;
 Ic is the integral component of the comparison of Xtarget and Xsense; Ic = Ic' + (Xtarget − Xsense); where Ic' = Ic from the previous iteration;
 Dc is the differential component of Xsense; Dc = Xsense − Xsense'; where Xsense' = Xsense from the previous iteration;
 Kp is the gain for the proportional component of the voltage output;
 Ki is the gain for the integral component of the voltage output;
 Kd is the gain for the differential component of the voltage output; and
where:
 Kp, Ki and Kd comprise the predetermined set of parameters stored in the first memory 69 representative of the stability range adapted for the type of generator 7.

After Xcontrol has been calculated at step 345, the microprocessor limits the field voltage 73 at step 347. Adjustments in the field voltage 73 are accomplished by varying the duty cycle of the PWM to vary the excitation level of the generator 7. A minimum duty cycle level corresponding to a minimum excitation level and a maximum duty cycle level corresponding to a maximum excitation level are stored in the first memory 69. The regulator 1 limits the duty cycle of the PWM to a range in which the generator 7 excitation will remain between the minimum and maximum excitation levels stored in the first memory 69. Overheating or a loss of synchronism of the generator 7 due to fluctuations in the load 5 is thereby prevented. The regulator 1 then generates the control signal at step 349. If the duty cycle necessary to regulate the electrical output is either below the minimum or above the maximum, as determined at step 347, the minimum or maximum, respectively, duty cycle is selected by the microprocessor 33.

Referring to FIG. 2, the microprocessor 33 evaluates the predetermined parameters stored in the first memory 69 through the use of a data link, referred to as comm port 77, for reading a desired memory location and for modifying of the first memory 69 for purposes of calibration, initialization or enabling. Monitoring the output current or the output voltage may also be accomplished. Such constitutes means for evaluating the predetermined parameters and for monitoring the predetermined parameters, such as generator 7 voltage, phase B current, generator 7 frequency power factor, field voltage 73 and the like.

The regulator 1 includes several protective features and means for shutting down the generator 7 which cause the regulator 1 to shut off the generator 7 excitation to avoid dangerous operating conditions. In case of overexcitation, loss of sensing, overvoltage or thermal shutdown, the regulator 1 operates to shut down the generator 7. This protects the generator 7 from unnecessary damage. FIG. 2 depicts a thermal switch 83 which triggers when the regulator 1 is in danger of overheating. Block 85, labeled loss of sensing, indicates an open circuit condition caused by a break in a sensing lead 21, 23 or 25 or a loose terminal. Surpassing a current limit 87 input triggers the microprocessor 33 to indicate an excessive current condition. The microprocessor 33 interacts with the second memory 71 in operating to generate the microprocessor 33 output signal. The microprocessor 33 feeds a signal via line 88 through a bus control 89 to the second memory 71 and light emitting diode (LED) drivers 91. The LED drivers 91 illuminate in response to a signal indicating that a fault has occurred causing generator 7 to shutdown and the cause of the shutdown. The regulator 1 thus acts as an event recorder for recording and displaying the shutdowns and causes thereof. Additional generator 7 protection is available through a hardware current limit 93.

The microprocessor 33 includes a run time meter. The inclusion of a run time meter enables basing warranty service on the actual service hours of the regulator 1 through implementation of clock means. The microprocessor 33 also includes means for detecting whether the regulator is being powered as part of the load 5 through the coupling transformer connected to the load or by an alternate source, such as the PMG.

Figure 4A:
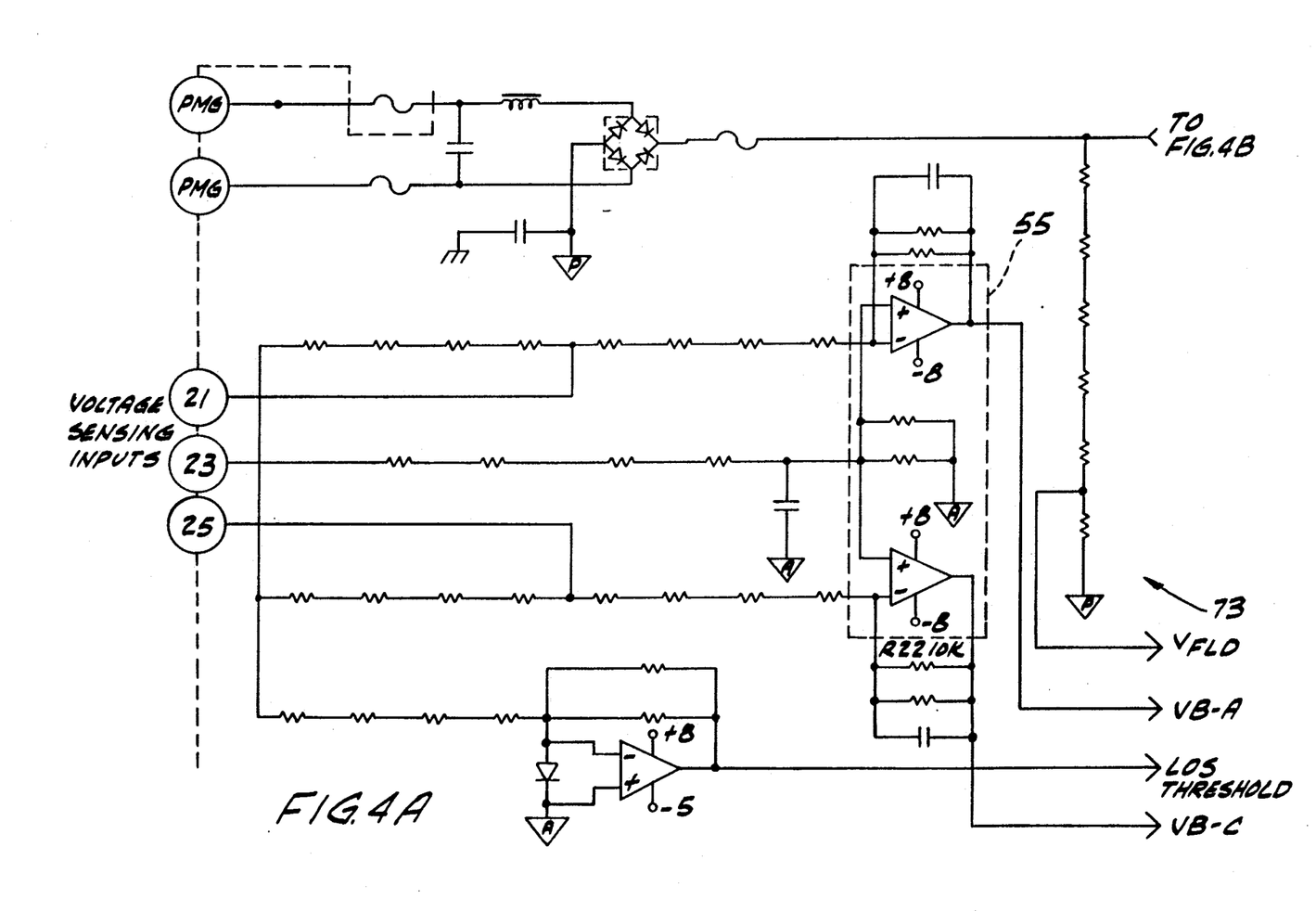

FIG. 4A illustrates the voltage sensing inputs 21, 23, and 25 which are used to generate the A-B voltage provided by terminal T20 and the B-C voltage provided by terminal T18. Initially these signals are amplified by differential amplifiers shown in the box referred to by reference character 55. The inputs labelled PMG indicate optional permanent magnet generator connections which may be used to power the regulator of the invention. Alternatively, the regulator may be powered by the output provided to the load. In either case, the field voltage 73 detected by the circuitry as illustrated in FIG. 4A is generated by a series of shunt resistors providing a field voltage signal on terminal T17.

Figure 4B:
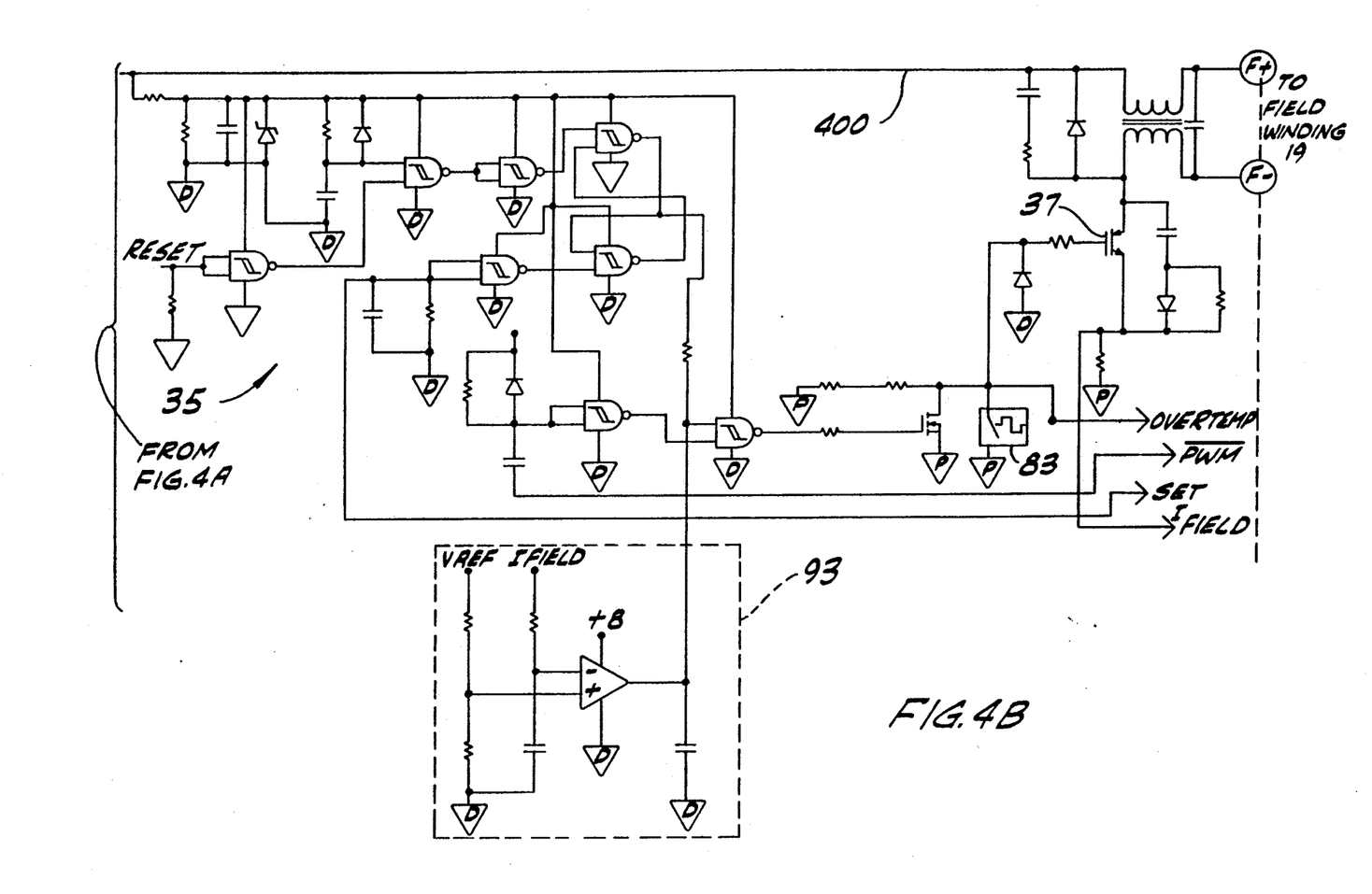

Referring to FIG. 4B, one preferred embodiment of the power switch 37 is illustrated. The logic gates of this circuit are controlled via terminal T14 by the microprocessor to pulse width modulate the voltage on line 400 applied to the transformer which is connected to the field winding 19. Outputs F+ and F− illustrate the terminals which are connected to the field winding 19. The microprocessor provides an output signal on terminal T14 which controls the PWM operation. FIG. 4B also illustrates the thermal switch 83 which disables PWM operation and results in a zero duty cycle in the event that the regulator is exposed to an excessive thermal load. In particular, thermal switch 83 disables power switch 37 to prevent pulse width modulation of the voltage being applied to the field winding 19. FIG. 4B also illustrates the hardware current limit 93. The current is detected by the input labelled IFIELD.

Figures 5, 6:
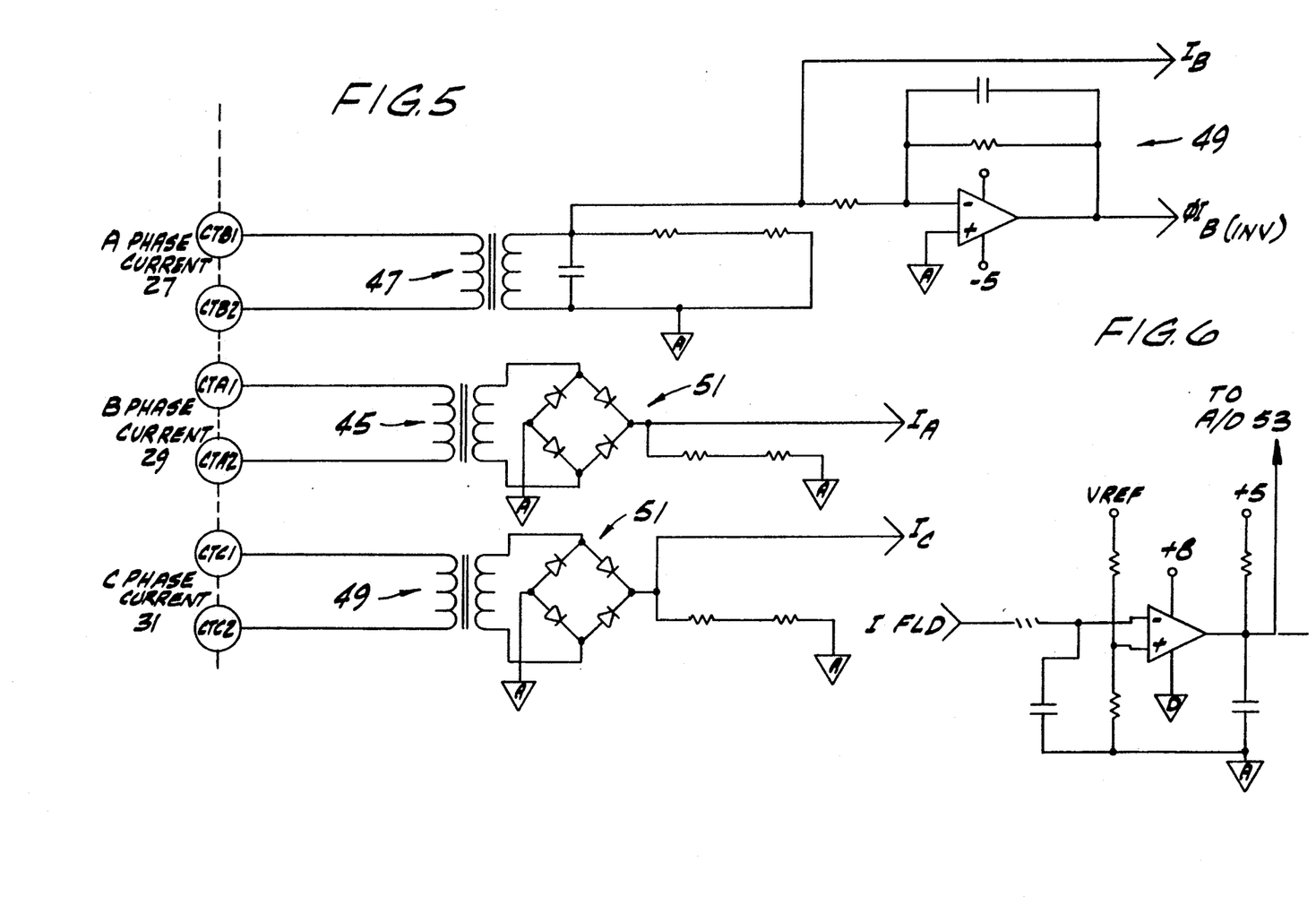
FIG. 5 is a schematic diagram illustrating the A phase, B phase, and C phase current sensing.
FIG. 6 is a schematic diagram illustrating the hardware current limiter according to the invention.

Referring to FIG. 5, the current detection circuitry is illustrated. In particular, the inputs for the A phase current 29, the B phase current 27, and the C phase current 31 are illustrated as current transformers (CT) having corresponding inputs numbered 1 and 2. As shown in block diagram form in FIG. 2, the B phase current also includes a zero crossing detector 48 which provides a signal via terminal T14 indicating the phase of the B phase current. Current transformers 45, 47, and 49 detect the current in the A phase, B phase, and C phase, respectively. The A and C phases are also full wave rectified by rectifiers 51. The B phase also includes a full wave rectifier which is not illustrated in FIG. 5.

FIG. 6 illustrates one preferred embodiment of a hardware current limiter according to the invention. A signal labelled as I FLD, which represents the field current, is compared to a preset reference and the resulting signal is provided to the A/D converter 53. If this resulting signal is above a pre-set maximum, the microprocessor 33 will indicate an excess field current condition.

Figure 7:
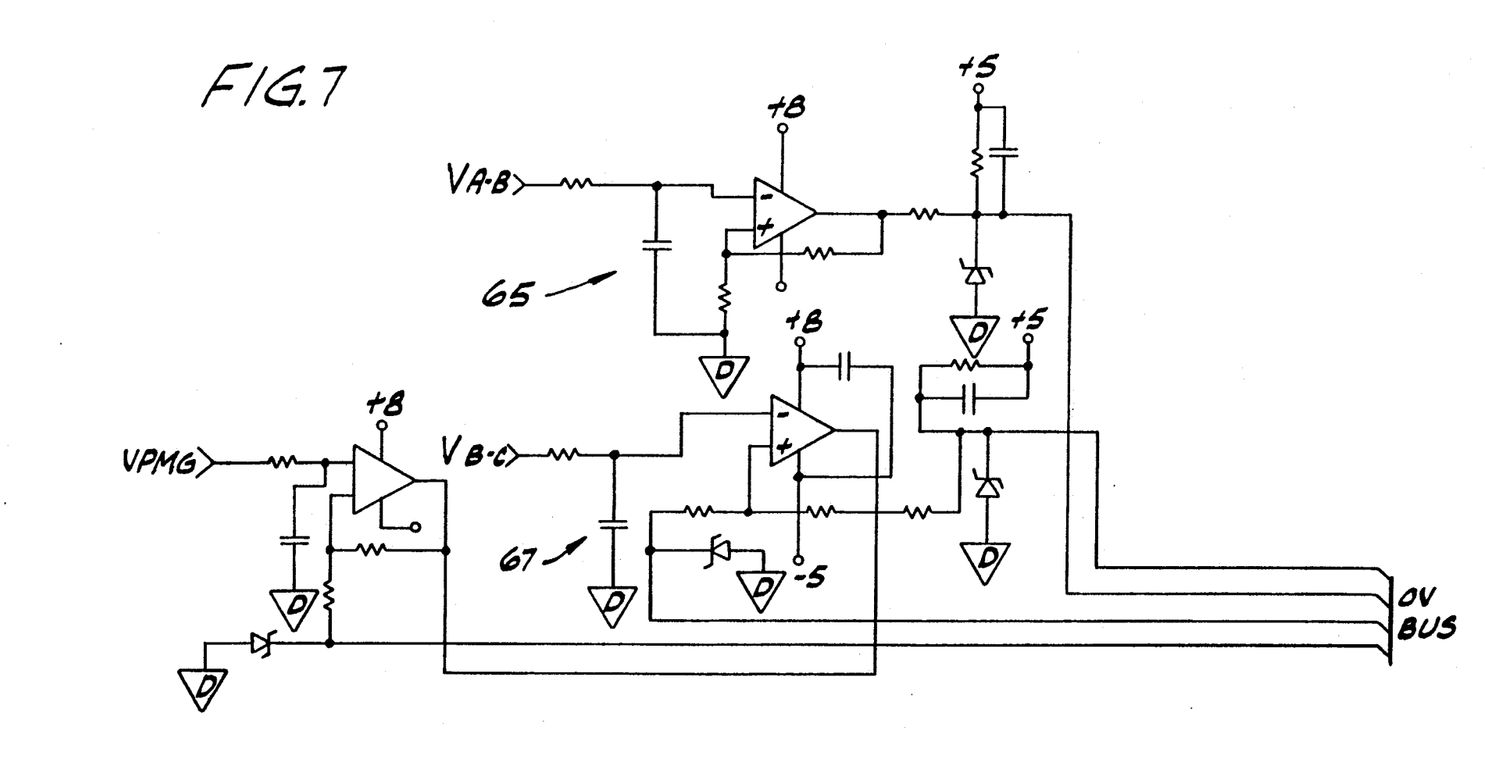
FIG. 7 is a schematic diagram illustrating the A-B and B-C zero crossing detector circuitry.

Referring to FIG. 7, the A-B voltage zero crossing detector 65 and the B-C voltage zero crossing detector 67 are illustrated. As shown in FIG. 2, these signals are provided to the microprocessor via the OV bus and are used by the microprocessor as indicated above.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A regulator providing a control signal for controlling a generator providing an electrical output including an output voltage and an output current applied to a load, said regulator comprising:
   means for sensing a parameter of the electrical output applied to the load;
   a first memory for storing at least one predetermined parameter corresponding to the sensed parameter;
   a microprocessor for comparing the sensed parameter to the corresponding predetermined parameter stored in said first memory, said microprocessor generating an output signal representative of the comparison;
   a second memory for storing instructions for controlling operation of said microprocessor; and
   means for generating the control signal as a function of the output signal from said microprocessor.

2. A regulator as set forth in claim 1 wherein an output winding is connected to the load, and wherein the generator has an exciter winding and a field winding generating a rotating field inducing the electrical output in the output winding connected to the load, said regulator further comprising means for energizing the field winding in response to the microprocessor output signal whereby excitation of the generator varies as the rotating field is influenced by a magnetic field produced by the field winding.

3. A regulator as set forth in claim 2 wherein the control signal controls energizing of the field winding for adjusting the rotating field as a function of the control signal thereby adjusting the electrical output as a function of the output signal from said microprocessor.

4. A regulator as set forth in claim 2 wherein said first memory includes a minimum duty cycle level corresponding to a minimum excitation level and a maximum duty cycle level corresponding to a maximum excitation level and further comprising means for limiting a duty cycle of the control signal between the minimum and maximum excitation levels stored in said first memory thereby preventing overheating or synchronism loss to the generator due to fluctuations in the load.

5. A regulator as set forth in claim 1 wherein said sensing means includes means for detecting a phase component and a magnitude component of the output current and a phase component of the output voltage, and wherein said microprocessor includes means for determining a phase relationship defined by an angular difference between the detected phase component of the output current and the detected phase component of the output voltage wherein the output current magnitude and the phase relationship represent a reactive component of the output current.

6. A regulator as set forth in claim 5 including voltage regulation means for controlling a magnitude of the output voltage applied to the load, PF means for controlling a power factor of the output current and the output voltage applied to the load, VAR means for controlling a volt-ampere-reactive component of the output current and the output voltage applied to the load, and means for selectively activating the voltage regulation means, the PF means of the VAR means.

7. A regulator as set forth in claim 6 further comprising:
   volt-ampere-reactive control means for adjusting the control signal based on both the output current phase component and the output current magnitude component to maintain the reactive current at a preset value stored in said first memory.

8. A regulator as set forth in claim 6 further comprising:
   power factor control means for adjusting the control signal based on the phase relationship to maintain the angular difference at a preset level stored in said first memory.

9. A regulator as set forth in claim 5 further comprising voltage regulation means for controlling the control signal to maintain a magnitude of the output voltage applied to the load at or near a predefined set point and wherein said microprocessor includes means for modifying the predefined set point as a function of the reactive component of the current thereby controlling the reactive component of the current applied to the load.

10. A regulator as set forth in claim 5 wherein said sensing means includes:
means for sensing one or more phases of the output voltage;
means for selecting predetermined parameters in response to phases sensed by the phase sensing means.

11. A regulator as set forth in claim 10 further comprising:
an A voltage input;
a B voltage input;
a C voltage input;
means for detecting a voltage waveform between the A and B inputs;
means for detecting a voltage waveform between the B and C inputs;
means for determining a phase difference between the A-B waveform and the B-C waveform; and
means for selecting predetermined parameters based on the determined phase difference.

12. A regulator as set forth in claim 11 wherein the selecting means selects parameters corresponding to a single phase configuration when the phase difference is approximately 0°, wherein the selecting means selects parameters corresponding to an A-B-C phase configuration when the phase difference is such that the A-B waveform leads the B-C waveform by approximately 60°, and wherein the selecting means selects parameters corresponding to an A-C-B phase configuration when the phase difference is such that the A-B waveform lags the B-C waveform by approximately 60°.

13. A regulator as set forth in claim 1 wherein said microprocessor includes a run time meter including clock means for measuring time of service of the regulator.

14. A regulator as set forth in claim 1 further comprising:
a first input for receiving a raise signal;
a second input for receiving a lower signal;
voltage regulation means for controlling the control signal to maintain a magnitude of the output voltage applied to the load at or near a predefined set point;
means for increasing the set point in response to a raise signal received by the first input; and
means for decreasing the set point in response to a lower signal received by the second input.

15. A regulator as set forth in claim 14 wherein the increase or decrease in the set point approximately equals one volt/second.

16. A regulator as set forth in claim 1 wherein said microprocessor includes means for evaluating the predetermined parameters stored in said first memory, the evaluation means including a data link for reading a desired memory location and for modifying said first memory for purposes of calibration, initialization or enabling.

17. A regulator as set forth in claim 16 wherein said evaluation means includes means for monitoring the electrical output of the generator.

18. A regulator as set forth in claim 1 further comprising means responsive to operator input for designating a predetermined set of parameters stored in said first memory representative of a stability range adapted for the type of generator to which said regulator is connected and means for initializing said regulator to the designated set of parameters whereby subsequent stability adjustments are minimized.

19. A regulator as set forth in claim 18 wherein said second memory includes the following discrete time control algorithm:

$$control = K * (a2 * X3 - a1 * X2 + a0 * X1)$$

where:
$X1 = X2'$
$X2 = X3'$
$X3 = Xtarget - Xsensed + X3'$; and where:
X1, X2 and X3 are variables stored in said first memory calculated in an iteration of the control algorithm and X1', X2' and X3 are X1, X2 and X3, respectively, of a previous iteration of the control algorithm;
Xtarget is a desired electrical output;
Xsensed is the sensed parameter;
a0, a1 and a2 comprise the predetermined set of parameters stored in said first memory representative of the stability range adapted for the type of generator;
K is a forward gain setting; and
Xcontrol is a duty cycle of a pulse-width modulated signal.

20. A regulator as set forth in claim 18 wherein said second memory includes the following discrete time control algorithm:

$$Xcontrol = X control' + Kp * Pc - Ki * Ic - Kd * Dc$$

where:
Xcontrol is the duty cycle of a pulse-width modulated signal for the iteration;
Xcontrol' is the Xcontrol from the previous iteration;
Pc is a proportional component of the comparison of Xtarget and Xsensed; Pc = Xtarget - Xsensed;
Ic is an integral component of the comparison of Xtarget and Xsensed; Ic = Ic' + (Xtarget - Xsensed); Ic' = Ic from the previous iteration;
Dc is a differential component of Xsensed; Dc = Xsensed = Xsensed'; Xsensed' = Xsensed from the previous iteration;
Kp is a gain for the proportional component of the voltage output;
Ki is a gain for the integral component of the voltage output;
Kd is a gain for the differential component of the voltage output; and
where:
Kp, Ki and Kd comprise the predetermined set of parameters stored in said first memory representative of the stability range adapted for the type of generator.

21. A regulator as set forth in claim 1 wherein said microprocessor includes means for shutting down the generator in response to overexcitation, loss of sensing, overvoltage or thermal shutdown to protect the generator from damaging operating conditions, and an event recorder for recording and displaying the shutdowns and causes thereof.

22. A regulator as set forth in claim 18 wherein said second memory includes the following discrete time control algorithm:

$$RV = FRSP + AI + UF - EU + D$$

where:
- RV is a reference value or regulation target voltage;
- FRSP is a flat regulation set point;
- AI is an accessory input voltage adjustment;
- UF is an under frequency compensation voltage adjustment;
- EU is an engine unloading voltage adjustment;
- D is a voltage adjustment for controlling droop; and where:

$$FRSP = 6 * CVA + 0.5 * FVA + RU - RD$$

where:
- CVA is a course voltage adjustment from said first memory;
- FVA is a fine voltage adjustment from said first memory;
- RU is 1 volt/second of remote up static adjustment;
- RD is 1 volt/second of remote down static adjustment; and where:

$$AI = (ACC - 512) * Kacc$$

where:
- ACC is an accessory analog to digital input value;
- Kacc is an accessory gain from said first memory; and where:
- UF = 0 if a frequency f is greater than or equal to UFSP;
- UF = (UFSP − f) * Kuf if the frequency f is less than UFSP where:
- f is an observed frequency of the generator in hertz;
- UFSP is an under frequency set point in hertz from said first memory;
- Kuf is an under frequency gain from said first memory; and where:
- EU = 0 if the frequency f is greater than or equal to EUSP;
- EU = 0 if the frequency is less than EUSP and Df is not greater than EUCR;
- EU = (EUSP − f) * Keu if the frequency f is less than EUSP and Df is greater than EUCR where:
- f is the observed frequency of the generator in hertz;
- EUSP is an engine unloading frequency set point in hertz from said first memory;
- Keu is an engine unloading gain from said first memory;
- Df is a change in observed frequency in hertz/second;
- EUCR is a set point for change in observed frequency in hertz/second to start the engine unloading from said first memory; and where:
- D = 1 * RC * Kd if power factor is leading;
- D = −1 * RC * Kd if the power factor is lagging where:
- RC is a reactive current component observed in the output current; and
- Kd is a droop gain from said first memory.

* * * * *